United States Patent
Crandon et al.

(10) Patent No.: US 9,139,716 B2
(45) Date of Patent: Sep. 22, 2015

(54) ADHESION PROMOTING COMPOUND

(75) Inventors: Nicholas Matthew Crandon, Sale Chesire (GB); Nicholas Pagliuca, Leigh Lancashire (GB); Samar Mushtaq, Rochdale (GB); David Jason Rimmer, Leyland Lancashire (GB); Peter William Salthouse, Knutsford Chesire (GB)

(73) Assignee: SUN CHEMICAL B.V., Weesp (NL)

(*) Notice: Subject to any disclaimer, the term of this patent is extended or adjusted under 35 U.S.C. 154(b) by 0 days.

(21) Appl. No.: 13/819,493

(22) PCT Filed: Sep. 1, 2011

(86) PCT No.: PCT/GB2011/051641
§ 371 (c)(1),
(2), (4) Date: Feb. 27, 2013

(87) PCT Pub. No.: WO2012/028882
PCT Pub. Date: Mar. 8, 2012

(65) Prior Publication Data
US 2013/0157020 A1    Jun. 20, 2013

Related U.S. Application Data

(60) Provisional application No. 61/379,149, filed on Sep. 1, 2010.

(51) Int. Cl.
*C09D 5/00* (2006.01)
*C08K 5/56* (2006.01)
(Continued)

(52) U.S. Cl.
CPC ... *C08K 5/56* (2013.01); *B32B 3/10* (2013.01); *B41M 5/5227* (2013.01); *C08K 5/05* (2013.01); *C08K 5/57* (2013.01); *C09D 5/002* (2013.01); *C09D 7/125* (2013.01); *C09D 7/1233* (2013.01); *C09D 11/03* (2013.01); *C09D 11/102* (2013.01);
(Continued)

(58) Field of Classification Search
CPC ........ C09D 5/002; C09D 11/102; C09D 5/00; C08K 5/56; C08K 5/57; C08L 77/00; B32B 3/10; B41M 5/5227; B41M 5/52
USPC ................. 428/32.3, 201; 524/391, 398, 145
See application file for complete search history.

(56) References Cited

U.S. PATENT DOCUMENTS 6,899,824 B2 * 5/2005 Meyer et al. ............. 252/299.64
7,430,982 B2 * 10/2008 Koivukunnas et al. ....... 116/219

FOREIGN PATENT DOCUMENTS

| EP | 0 730 014 A1 | 9/1996 |
|----|--------------|--------|
| GB | 2 161 817 A | 1/1986 |
| JP | 05-295313 | * 11/1993 |
| WO | WO 2005/049662 A1 | 6/2005 |

*Primary Examiner* — Bruce H Hess
(74) *Attorney, Agent, or Firm* — Charles C. Achkar; Ostrolenk Faber LLP (57) ABSTRACT

The present invention is drawn to adhesion promoters comprising an organotitanium compound and a polyamide, for use in solvent-based liquid inks and coatings for flexible packaging, including non-direct food packaging, uses of such adhesion promoters, methods of using such adhesion promoters, inks and coating comprising such adhesion promoters and articles printed with the inks and coatings comprising such adhesion promoters, for example, a laminated printed article (20) comprising a printed image (1) on a substrate (2) and superimposed with an overlay (3) wherein the printed image (1) is prepared from inks or coatings comprising the adhesion promoters.

17 Claims, 1 Drawing Sheet

(51) Int. Cl.
  *C08K 5/57*  (2006.01)
  *C08L 77/00* (2006.01)
  *B32B 3/10*  (2006.01)
  *B41M 5/52*  (2006.01)
  *C09D 7/12*  (2006.01)
  *C09D 11/03* (2014.01)
  *C09D 11/102* (2014.01)
  *C08K 5/05*  (2006.01)

(52) U.S. Cl.
  CPC ............... *C08L 77/00* (2013.01); *Y10T 156/10* (2015.01); *Y10T 428/24802* (2015.01); *Y10T 428/24851* (2015.01)

* cited by examiner

ADHESION PROMOTING COMPOUND

This application is a 35 U.S.C. §371 National Stage Entry of International Application No. PCT/GB2011/051641, filed Sep. 1, 2011, which claims priority to U.S. Provisional Application No. 61/379,149 filed Sep. 1, 2010, all of which hereby are incorporated by reference in their entirety for all purposes as if fully set forth herein.

BACKGROUND

Adhesion promoters have long been used in liquid inks to improve adhesion and resistance properties to enable the liquid ink formulations to meet the requirements of the customer and the end-user. The main purposes of the adhesion promoter is to improve adhesion to prevent removal of ink from the substrate and to prevent potential contamination of the packaged product due to ink removal. Titanium based compounds are widely used in liquid inks to improve the adhesion of the color system to substrates such as flexible packaging. Adhesion promoters to date produce the desired properties after a specified dwell time, for example 24 hours or longer, and impart limited adhesion to some substrates, especially those with low surface tension and coated substrates, for example those coated with aluminum oxide and silica oxide.

Those titanium based compounds may be used without a synergist, as described for example in U.S. Pat. Nos. 4,094,853, 4,087,402, 4,659,848, WO04053003 and U.S. Pat. No. 7,619,021, or with a synergist, as disclosed in U.S. Pat. Nos. 4,725,501, 4,909,846 and 5,116,411.

Adhesion promoters currently employed in liquid inks for flexible packaging typically have the following characteristics and performance properties:
  Impart adhesion of an ink or coating after a specified period of time, such as for example, 24 hours or longer.
  Require the application of elevated temperature to reduce the time to impart adhesion or improved adhesion.
  Provide limited adhesion to some untreated substrates or substrates with low surface tension, for example those with a surface tension of less than 38 dynes/cm.
  Impart limited adhesion to certain coated plastic substrates such as, but not limited to those coated with aluminum oxide, silica oxide, PVdC, Acrylic, PVOH, Nitrocellulose.
  Create odor issues, for example odor associated with the release of acetyl acetone (2,4-pentanedione) present in titanium acetyl acetone adhesion promoters; the release of propionic acid when using zirconium propionate adhesion promoter and the release of amylic alcohol.
  Require additional resins such as but not limited to high acid value additives, (i.e. greater than 100 mg/KOH), to minimize and/or control thickening in the ink or coating medium.
  Require the use of specific solvents, for example higher alcohols, for stability.
  Impart discoloration, for example yellowing problems in white inks associated with titanium acetyl acetone adhesion promoters, high acid value resins used to stabilize organo-titanates.
  Can reduce lamination performance if used at higher levels (i.e. the level of addition required to bring about desired adhesion may reduce lamination performance).
  In examples of lamination failure, ink removal or transfer may be viewed as a mode of failure.
  Usage levels needed to obtain desirable adhesion often leads to a compromise of other ink performance properties.

WO 2005/049662 discloses an adhesion-modified acid functional polyamide resin including a non-yellowing titanate chelate having amyl acid phosphate ligands. Due to the potential for amyl acid phosphate to breakdown to amylic alcohol, the adhesion modifier in WO 2005/049662 can create an odor.

Traditional adhesion promoters are effective in crosslinking hydroxy-functional resins (for example nitrocellulose, polyvinyl butyral, cellulose acetate butyrate, polyamide, polyurethane, etc.) commonly employed in commercial liquid inks to impart improved adhesion to plastic substrates. WO 2004/053003 describes the general mechanism of adhesion as occurring via a condensation reaction between titanium alkoxy groups and polymer hydroxyls. WO 2004/053003 also explains that the mechanism of thickening in the ink is due to a tendency for a crosslinking reaction to occur in the coating formulation during storage or during mixing. Those skilled in the formulation of liquid inks have traditionally employed the use of high acid value materials, for example, maleic resin, dodecyl benzene sulphonic acid, ortho-phosphoric acid, dimerised rosin, etc., with an acid value in excess of 25 mg KOH/g and more preferably in excess of 100 mg KOH/g to reduce the undesirable thickening during storage. Thickening is determined by measuring the viscosity of the ink at the time of the final quality control check after manufacture and comparing this to the viscosity at a later time, for example after a period of 24 hours, several days, months or even years. Viscosity can be measured using any number of viscometers or viscosity flow cups or can be compared by manually stirring with an ink knife or spatula and noting the viscosity difference. In the present application, viscosity stability was assessed by measuring viscosity using a DIN 4 viscosity flow cup immediately after ink manufacture and then taking comparative viscosity readings after 24 hours at 25° C. A rise in viscosity after manufacture is considered disadvantageous (see Table 5).

The use of high acid value materials can present undesirable side effects such as a reduction in water/moisture barrier properties, discoloration and a reduction in printability performance. The novel adhesion promoters of the present invention exhibit improved stability and do not require the use of high acid value resins, thereby allowing simpler formulations with improved properties.

SUMMARY OF THE INVENTION

In a first aspect, present invention provides an adhesion promoter comprising: (a) organotitanate compound; (b) polyamide having an acid and an amine value of from 1 to 25 mg KOH/g. The adhesion promoter typically further comprises (c) one or more optional additives; and (d) a balance of volatile organic compound(s). Typically, (a) the organotitanate compound is present in the adhesion promoter at a level of about 10 to 60% by weight. Typically, (b) the polyamide is present in the adhesion promoter at a level of about 10 to 60% by weight. Typically, (c) the optional additive is present in the adhesion promoter at a level of up to about 20% by weight. Component (d), the volatile organic compound, is typically an organic solvent, such as an alcohol, ester or glycol solvent. In some systems water is more appropriate. The volatile organic solvent advantageously includes at least one alcohol solvent. The adhesion promoter may, for example, comprise: about 10 to 60% by weight organotitanate compound; about 10 to 60% by weight alcohol soluble polyamide having an acid and an amine value of from 1 to 25 mg KOH/g; and a balance of a solvent, which solvent includes an alcohol, optionally an ester and optionally a glycol. The adhesion promoting compound is typically suitable for use in liquid inks and coatings, especially liquid inks and coatings for flexible packaging.

In a second aspect, the present invention provides an ink or coating comprising an adhesion promoter comprising: (a) organotitanate compound; (b) polyamide having an acid and an amine value of from 1 to 25 mg KOH/g. The inks and coatings of the second aspect of the invention may, for example, comprise the adhesion promoting composition of the first aspect of the invention.

In a third aspect, the present invention provides the use of a combination of (a) organotitanate compound; (b) polyamide having an acid and an amine value of from 1 to 25 mg KOH/g to promote the adhesion of an ink or coating to a substrate. The combination used in the third aspect of the invention may, for example, be the adhesion promoter of the first aspect of the invention.

In a fourth aspect, there is provided a method of producing a printed or coated article, comprising the step of applying the ink or coating comprising an adhesion promoter comprising: (a) organotitanate compound; (b) polyamide having an acid and an amine value of from 1 to 25 mg KOH/g to a substrate. The ink or coating applied in the method of the fourth aspect of the invention may, for example, be the ink or coating of the second aspect of the invention. The method may, optionally, further comprise the step of curing the ink or coating. In one embodiment of the fourth aspect, there is provided a method of producing a laminated article, comprising the steps of applying the ink or coating to a substrate and superimposing an overlay over the ink or coating to form a laminated article.

In a fifth aspect, there is provided a printed article comprising an ink or coating comprising a combination of (a) organotitanate compound; (b) polyamide having an acid and an amine value of from 1 to 25 mg KOH/g on a substrate. The ink or coating may, for example, be that of the second aspect of the invention. The printed article may, for example, be prepared in accordance with the method of the fourth aspect of the invention.

The present invention offers novel adhesion promoters, which have been found to typically provide one or more of the following technical advantages over the prior art:

Acceptable adhesion is observed immediately after printing and drying.

Elevated temperatures are not generally required for activation.

Acceptable adhesion is observed on substrates with low surface tension, such as those with treatment levels below 38 dynes/cm.

Adhesion is observed on many coated plastic substrates, such as, but not limited to those coated with aluminum oxide, silica oxide, PVdC, acrylic, PVOH, nitrocellulose.

Reduced odor compared to titanium acetyl acetone (TAA), zirconium propionate adhesion promoters and others.

Additional materials, for example high acid value materials, are typically not required for stability.

Discoloration, especially yellowing in white inks, is minimized or eliminated.

Lamination performance is not negatively affected, and in some cases the performance is improved.

Improved ink lamination bond strength is such that the mode of delamination failure is typically other than ink removal or transfer.

Acceptable adhesion level may be obtained with a lower amount of adhesion promoter.

When increased amounts of adhesion promoter are used, it does not bring about a reduction in lamination performance.

The novel adhesion promoters of the present invention are been typically found to offer one or more of the following commercial advantages:

Providing an adhesion additive with a broader application platform, which in turn reduces the need to inventory a wide range of materials employed in printing ink formulations.

Allowing lower amounts to be used to achieve the desired adhesion providing: (1) lower cost contribution to the ink, (2) ink viscosity may be lower which may give higher ink color strength, (3) tack may be lower which may improve printability, (4) allows more latitude in the formulation for other ink components.

Eliminating the need for stabilizing resins, such as for example high acid value resins.

Reduced customer rejection rate due to reduced chance of adhesion failure, lamination failure, odor and yellowing.

Polyamides are used in ink and coating formulations to provide release characteristics to the printed package, preventing two packages adhering to one another. For example, printing inks used to form an image on polyethylene packages, such as bags of garden compost, which contain polyamide resins adhere to the polyethylene substrate whilst providing a release layer than prevents two packaging sticking to one another.

It has now been found that a combination of an organic titanate with an alcohol-soluble acid-amine functional polyamide typically provides one or more the significant advantages mentioned above. In particular, the adhesion promoter of the present invention present has been found not only to be suitable for use on a broad range of substrates both in surface printing but has also been found to be useful as a lamination ink without adversely effecting the adhesion between layers.

DETAILED DESCRIPTION OF THE INVENTION

The present invention is directed to an adhesion promoter that is advantageously suitable for use in solvent-based liquid inks and coatings for flexible packaging, including non-direct food packaging that includes an organo-titanate with a synergistic polyamide additive.

Component (a), the organo-titananium compound in the adhesion promoter of the first aspect of the invention is advantageously an organo-titanate selected from an titanium orthoester and an organo-titananium chelate. Titanium orthoesters are also referred to as esters of orthotitanic acid and are typically of the form $Ti(OR)_4$ wherein R is an alkyl, such as a $C_1$ to $C_8$ alkyl especially a $C_3$ to $C_4$ alkyl. The organo-titananium chelate are typically titanium (IV) chelates comprising one or more chelating ligands and, optionally, one or more alkoxy groups (—OR groups where R is alkyl as described above). Titanium (IV) forms chelates with a range of oxygen-containing compounds that include carboxylic acids, especially hydroxyl acids, for example, salicylic acid and lactic acid; phosphoric acids and phosphate esters; polyols, for example, dihydroxy compounds; diketo compounds; hydroxy keto compounds; and amino alcohols. The organo-titananium compound is, for example, the reaction product of a titanium complex, such as a titanium orthoester, especially a titanium (IV) complex, and a phosphate ester or a ketone, such as a diketone or hydroxyl ketone. The organo-titananium compound may, for example, be a titanium phosphate compound. Suitable organo-titananium compounds include titanium diacetylacetonate, which is the reaction product of tetraisopropyltitanate and acetylacetone (2,4-pentanedione). Suitable phosphates include alkyl phosphates and amyl acid phosphates, especially alkyl phosphates. Suitable alkyl phosphates include monoalkyl phosphates, for example of the formula $(R^1O)PO(OH)_2$ where $R^1$ is an alkyl group such as a $C_1$ to $C_{10}$ alkyl, especially a $C_1$ to $C_5$ alkyl, and dialkylphosphates, for example of the formula $(R^2O)(R^3O)PO(OH)$ where $R^2$ and $R^3$ are independently alkyl groups such as $C_1$ to $C_{10}$ alkyl, especially $C_1$ to $C_5$ alkyl. Non-yellowing organo-titanium chelates are preferred such as, for example, titanium IV isopropoxide (such as that available under the trade name: Vertec RJCE). Low odor and/or non-yellowing organo-titananium chelates are especially preferred such as, for example, titanium butyl phosphate (such as those available under the trade names: Vertec IA-10, Borica Tytan AP100, Polygel LakeCM Ti—C 30, Dorf Ketal Tyzor IAM) and diisobutoxy-bisethylacetoaceto titanate (such as that available under the trade name: Dorf Ketal Tyzor IBAY). Organo-titanium chelates may also include a water-based titanium complex such as titanium lactic acid chelates, for example the chelate produced where two hydroxyl groups in $Ti(OR)_4$ are replaced by lactyl groups (such as that available under the tradename Dorf Ketal Tyzor LA). Organo-titanium chelates may be salts, such as the lactic acid titanium chelate ammonium salt, dihydroxy bis (ammonium lactato) titanium(IV).

Component (b), the polyamide, advantageously functions as a synergist that enhances the performance of the titanate adhesion promoter. The polyamide is typically a polyamide resin. The acid and amine value of the polyamide may, for example, be tested according to DIN 53 240. The polyamide typically has an acid value between 1 and 25 mg KOH/g, especially an acid value between about 3.5 and about 15 mg KOH/g. The polyamide advantageously has an acid value of at least 2.0 mg KOH/g, especially at least 3.0 mg KOH/g, for example at least 3.5 mg KOH/g. In some embodiments, the polyamide has an acid value of at least 5.0 mg KOH/g, for example at least 7.0 mg KOH/g. The polyamide advantageously has an acid value of no more than 20 mg KOH/g, especially no more than 18 mg KOH/g, for example no more than 15 mg KOH/g. The polyamide typically has having an amine value between 1 and 25 mg KOH/g, especially an amine value between about 3.5 and about 15 mg KOH/g. The polyamide advantageously has an amine value of at least 2.0 mg KOH/g, especially at least 3.0 mg KOH/g, for example at least 3.5 mg KOH/g. In some embodiments, the polyamide has an amine value of at least 5.0 mg KOH/g, for example at least 7.0 mg KOH/g. The polyamide advantageously has an amine value of no more than 20 mg KOH/g, especially no more than 18 mg KOH/g, for example no more than 15 mg KOH/g.

Polyamide used in the ink industry are produced by condensation of dimerised fatty acids (manufactured by polymerizing tall oil fatty acids) and aliphatic diamines. Termination is determined by the ratio of dicarboxylic acid and diamine used in the preparation of the polyamide. The polyamide is typically the reaction product of a dicarboxylic acid and a diamine. The polyamide may, optionally, be the reaction product of from 1.2 to 1.0 mole equivalent of dicarboxylic acid with from 1.0 to 1.2 mole equivalent of diamine, especially the reaction product of from 1.1 to 1.0 mole equivalent of dicarboxylic acid with from 1.0 to 1.1 mole equivalent of diamine, especially the reaction product of from 1.05 to 1.0 mole equivalent of dicarboxylic acid with from 1.0 to 1.05 mole equivalent of diamine such as the reaction product of approximately a 1:1 ratio of dicarboxylic acid to diamine. When the dimerised fatty acid is used in excess, for example 1.2 moles dimerised fatty acid to 1 mole aliphatic diamine an acid terminated polyamide is formed. When the ratio is in favor of the aliphatic diamine for example 1 mole dimerised fatty acid to 1.2 moles aliphatic diamine an amine terminated polyamide is formed. When an approximately equivalent ratio is used, i.e. 1 mole dimerised fatty acid to 1 moles aliphatic diamine a balanced polyamide with a balance of acid and amine functionality is formed. Advantageously, the polyamide of the adhesion promoter of the present invention is a balanced polyamide.

Component (b), the polyamide, is typically a co-solvent polyamide resin, an alcohol-reducible polyamide resin or an alcohol soluble polyamide resin, especially an alcohol soluble polyamide resin, for example a ethanol-soluble resin. The polyamides used in solvent-based liquid inks can be divided in three categories:
  (i) Co-solvent polyamides: designed to be soluble in blends of alcohols and/or aliphatic hydrocarbons. This class of resins is the least compatible with the solvency of flexographic printing inks and of most of the other modifying resins used in liquid inks
  (ii) Alcohol-reducible polyamides: designed to have co-solvent type properties, but to be alcohol-reducible; this gives an improved compatibility with modifying resins.
  (iii) Alcohol-soluble polyamides: designed to be soluble in ethanol or in a blend of alcohols, and to also have a very good ester tolerance: this makes them the desirable polyamides to use in liquid inks, as alcohol and ester blends are the most common solvent-based solvency.

Suitable polyamide resins for use in the adhesion promotion compound of the invention include, but are not limited to: Unirez 119; Unirez 138 Eurelon 975, Flexrez 1084AS and Casamid 874.

| Supplier | Material | Acid Value mgKOH/g | Amine Value mgKOH/g | Softening ° C. |
|---|---|---|---|---|
| Arizona Chemicals | Unirez 119 | 4.2 | 3.5 | 100 |
| Arizona Chemicals | Unirez 138 | 1.6 | 2.1 | 140 |
| Huntsman | Eurelon 975 | ≤6 | ≤5 | 171-181 |
| Hexion | Flexrez 1084 | ≤15 | ≤15 | 115 |
| Thomas Swan | Casamid 874 | ≤6 | ≤6 | 105-115 |

Component (d), the volatile organic diluent, is typically an organic solvent, such as alcohol, ester or glycol solvent. The volatile organic solvent advantageously includes at least one alcohol. Advantageously, at least 40 wt % of the volatile organic diluent is alcohol, for example at least 50 wt %, especially at least 60 wt % of the diluent. In some embodiments, substantially all the volatile organic diluent is alcohol, for example at least 90 wt %, such as 100%. Thus, in one embodiment, the volatile organic diluent is an alcohol or a mixture of alcohols. Suitable alcohols include C-1 to C-8 alcohols, especially C-1 to C-8 aliphatic alcohol, for example C-1 to C-8 alkyl alcohols. The alcohols may be straight chain, for example, ethanol ($CH_3$—$CH_2$—OH) or propan-1-ol ($CH_3$($CH_2$)$_2$OH), branched, for example, 2-hydroxypropane ($CH_3$—CH(OH)—$CH_3$) or cyclic such as cyclohexanol, especially straight chain or branched alicyclic alkyl alcohols. The alcohol solvents may include additional functional groups such as ester functionalities, for example, 1-methoxy-2-propanol ($C_4H_{10}O_2$) and 3-ethoxy-1-propanol ($C_5H_{12}O_2$). Other solvents that may be suitable for use a diluents in the adhesion promoters of the invention include esters, including aliphatic esters such as ethyl ethanoate ($CH_3COOCH_2CH_3$) and n-propyl ethanoate ($CH_3COOC_3H_7$). The ester solvents are typically C-1 to C-8 esters, such as C-1 to C-6 alkyl esters.

The inks and coatings of the second aspect of the invention are advantageously liquid, for example, at 25° C. The inks and coatings of the second aspect of the invention are preferably multipurpose inks and coating that are suitable for use both in surface printing and as lamination links. In one aspect, the inks and coating of the present invention are lamination inks that are, for example, suitable for use between plastics films in a laminated article. The adhesion promoter composition advantageously helps achieves the desired adhesion properties when incorporated into printing inks and coatings. Typically, the organotitanate compound and the polyamide of the adhesion promoter of the first aspect of the invention together comprise from about 0.5 to about 10% by weight (wt %) of the ink or coating of the second aspect of the invention, for example from about 0.5 to about 4 wt %. The adhesion promoter composition of the first aspect of the invention may, for example, be included in the liquid inks and coating of the second aspect of the invention at levels of from about 0.5 to about 10% by weight (wt %) of the ink or coatings, for example from about 1 to about 5 wt %. It has been found that using the adhesion promoters of the first aspect of the invention, good levels of adhesion of an ink or coating to a substrate can be obtained even when the organotitanate compound and the polyamide are present in the ink or coating at low levels. The low level of adhesion promoter use has been found not to substantially deleteriously effect the adhesion of subsequent layers of material to the printed or coated substrate when applied over the ink or coating.

The printing inks and coatings of the second aspect of the invention are typically applied with dry coating weights of about 1 to about 10 g/m$^2$ (grams per square meter) and more preferably from about 2 to about 5 g/m$^2$ applied onto the plastic substrate by methods such as but not limited to gravure and flexography.

The inks and coatings of the second aspect of the present invention are typically solvent-based, including water-based, formulations. It is also anticipated that the adhesion promoters of the present invention may also be suitable for use with other formulations including hybrid solvent-based/energy-curable inks or coatings as long as the adhesion promoter is compatible with the other materials contained in the formulation. When used in water-based or hybrid inks or coatings, the adhesion promoters typically comprise no more than 40 wt % volatile organic compound, for example no more than 20 wt %, especially no more than 10 wt % volatile organic compound. A solvent (including water) is typically included to provide a carrier for the polyamide.

Ink and coatings formulations of the second aspect of the invention may contain any additives suitable for use in printing inks and coatings, such as, for example: waxes, plasticizers, biocides, extender pigments, surfactants, defoamers, stabilizers, silicones, etc. Ink and coatings formulations of the second aspect of the invention may be free of colorants, or may contain as an additive any organic or inorganic pigment or dye or special effect pigment (or combination thereof) that are suitable for use in printing inks or coatings. Additives suitable for use in printing inks and coating s, including those referred to above, may, optionally, be present in the adhesion promoter. Advantageously, when additives are included in the adhesion promoter of the invention they are present at low levels. Advantageously, component (c) the optional additive(s) is present in the adhesion promoter at a level of no more than about 20% by weight, for example no more than about 15 wt %. Typically the optional additive(s) is present in the adhesion promoter at a level of no more than about 10 wt %, especially no more than about 5 wt5, for example no more than about 3 wt %. In some embodiments, the adhesion promoter consist essentially of (a) the organotitanate compound, (b) the polyamide with the balance being a volatile organic diluent with substantially no additional components, for example, no more than 3 wt % additional components, especially no more than 2 wt % additional components.

In the third aspect, the present invention provides a method of improving the adhesion performance of an ink or coating comprising adding to said composition a combination of (a) organotitanate compound; (b) polyamide having an acid and an amine value of from 1 to 25 mg KOH/g. For example, the present invention provides a method of improving the adhesion performance of an ink or coating comprising adding to said composition adhesion promoter of the first aspect of the invention. In one embodiment of the third aspect of the invention, the combination of (a) organotitanate compound; (b) polyamide having an acid and an amine value of from 1 to 25 mg KOH/g may be used to improve the adhesion of an ink or coating to a flexible plastic film substrate. The combination may, advantageously, be used to promote adhesion of inks and coating that are used both in surface printing and as a lamination ink or coating. In one embodiment of the third aspect of the invention, the composition may be used to improve the adhesion of a lamination ink or coating to a substrate. Advantageously, the use of the composition in a lamination ink or coating improves the adhesion of the overlay to the printed substrate of a laminate comprising said lamination ink between the layers of the laminate. In a further embodiment the composition may be used in a lamination ink or coating to improve the bond strength of a laminate.

The adhesion promoters of the present invention may, advantageously, be used in lamination inks or coating. For example, inks or coating comprising the adhesion promoter of the invention may be used in a method of preparing a laminated article comprising the steps of applying the ink or coating to a substrate, superimposing an overlay over the ink or coating on the substrate to form a laminated printed article. Thus, in one embodiment of the fourth aspect of the invention there is provided a method of producing a laminated printed article comprising the step of applying the ink or coating of the second aspect of the invention to a substrate and superimposing an overlay over the ink or coating on the substrate to form a laminated printed article. The method may, for example, involve a curing step in which the ink or coating is cured prior to the superimposing of the overlay. In a laminated article, the overlay is typically a film of plastics material, especially a flexible plastics material. Typically heat and/or pressure is applied to form the laminated article, for example to bond the substrate and the overlay together. The method of producing the printed article may include a lamination step, for example a step in which the coverlay on the substrate is heated and or pressure is applied to the overlay on the substrate. The heating typically involves heating to a temperature of about 100° C. or more, especially about 120° C. or more. Pressures of about 10 psi (70 kPa) or more, especially about 15 psi (100 kPa), for example, about 20 psi or more (140 kPa) are typically used. Optionally, an adhesive is additionally applied between the substrate and the overlay, for example, between the ink or coating and the overlay. The adhesive may be applied to the printed ink or coating on the substrate, either as a dry film or a liquid composition or may be applied to the overlay prior to the bringing together of the overlay and the printed substrate Inks and coating of the present invention have been found to be suitable for use in lamination applications. The ink or coating advantageously remains adhered to the substrate and also enabling good lamination bond strengths to be achieved, for example by forming a strong bond to the adhesive.

It has been surprisingly found that solvent-based liquid inks containing the novel adhesion promoter exhibit improved adhesion onto plastic substrates, with excellent rheological stability without adversely affecting other printing ink properties. The adhesion promoters of the present invention advantageously helps to achieve desired adhesion and resistance properties in inks and coatings, for example in solvent-based liquid inks and coatings, over a wide range of substrates, including traditionally difficult substrates such as, but not limited to, those substrates coated with aluminum oxide, silica oxide, PVdC, Acrylic, PVOH and Nitrocellulose. This makes the adhesion promoters of the present invention and highly desirable for use in liquid inks The substrate may, for example be used in the formation of a flexible packaging, for example a flexible packaging used to package a foodstuff. In one embodiment of the fifth aspect of the invention the printed article is a flexible packaging.

The novel adhesion promoters are advantageously stable in all colors and do not require the addition of stabilizing resins (such as high acid value resins) that are commonly required with titanate adhesion promoters, thereby simplifying formulations and overcoming common downsides of stabilizing resins.

In summary, the present invention typically provides:

An adhesion promoter comprising about 10-60% by weight organo-titanate compound, about 10-60% by weight polyamide having an acid and amine value between 1 and 25mg KOH/g and a volatile organic diluent, especially an alcohol.

A method for employing an adhesion promoting compound to a solvent based liquid ink which is stable in terms of viscosity.

A method for applying the aforementioned solvent based liquid ink to produce a printed article wherein the printed article adheres to the substrate forming a low odor, non-yellowing print which retains adhesion and lamination properties when the coating composition is applied at a specific coating weight.

An adhesion promoter suitable for use in gravure and flexography printing inks and coatings.

An adhesion promoter that allows harmonization of adhesion additives employed in printing ink formulations, allows lower amounts to be used to achieve the desired adhesion properties, and allows removal of stabilizing resins such as high acid value resins (all major benefits).

EXAMPLES

The following examples illustrate specific aspects of the present invention and are not intended to limit the scope thereof in any respect and should not be so construed.

Descriptions of Components

RJCE is titanium IV isopropoxide (Vertec RJCE)

Flex-Rez 1084AS is a polyamide resin with an acid number of ≤15 mgKOH/g and an amine number of ≤15 mgKOH/g Uni-Rez 138 is a polyamide resin with an acid number of 1.6 mgKOH/g and an amine number of 2.1 mgKOH/g Casamid 874 is a polyamide resin with an acid number of ≤6 mgKOH/g and an amine number of ≤6 mgKOH/g Surkopak 5246 and Surkopak 5323 are a thermoplastic polyurethane resins supplied by BIP (Oldbury) Ltd PU3552 is an elastomeric polyurethane resin supplied by Arakawa Neorez U-395 is an elastomeric polyurethane resin supplied by DSM Neoresins ATBC is a citrate plasticizer supplied by Univar Ltd TSDA is an ethanol solvent supplied by Brenntag Polyrub FA09 in IPA is a polyethylene wax solution supplied by Lawter Nitrocellulose color concentrates were supplied by SunChemical Ltd Tyzor AA75 is a titanium diacetylacetonate adhesion promoter supplied by Dorf Ketal Vertec IA10 is a titanium butyl phosphate adhesion promoter supplied by Dorf Ketal. The use of other titanium butyl phosphate products, namely, Borica Tytan AP100, Polygel LakeCM Ti—C 30 and Dorf Ketal Tyzor IAM gave adhesion promoters with near identical performance.

Zirconium propionate adhesion promoter is supplied by MEL Chemicals

Coatosil 1770 is a silane adhesion promoter supplied by Momentive

DLX3-5 (70% in IMS) is a nitrocellulose resin supplied by Nobel Enterprises

RDI-S is a $TiO_2$ pigment supplied by Sachtleben

OPP substrates are supplied as Mobil MB400 and Innovia RGP25

Chem PET substrates are supplied as Dupont Teijin Mylar 813 and Hostaphan GN4600

ALOx PET substrates are supplied as Amcor Camclear and Toray Barrialox

PVdC PET substrates are supplied as Toray T22.00 and Dupont Teijin D887

PVdC PET substrates are supplied as Mobil MB777 and Innovia RDU21

OPA substrates are supplied as Sudpack OPA and Wipak OPA

Adhesion Promoter Formulations

TABLE 1

| Organo-titanate synergist additives. | | | | | |
|---|---|---|---|---|---|
| AP Additive 1 | % | AP Additive 2 | % | AP Additive 3 | % |
| Flex-Rez 1084AS | 30.0 | Uni-Rez 138 | 30.0 | Casamid 874 | 30.0 |
| Ethanol | 30.0 | Ethanol | 30.0 | Ethanol | 30.0 |
| IA10 | 40.0 | IA10 | 40.0 | IA10 | 40.0 |
| AP Additive 4 | % | AP Additive 5 | % | AP Additive 6 | % |
| Flex-Rez 1084AS | 30.0 | Uni-Rez 138 | 30.0 | Casamid 874 | 30.0 |
| Ethanol | 30.0 | Ethanol | 30.0 | Ethanol | 30.0 |
| RJCE | 40.0 | RJCE | 40.0 | RJCE | 40.0 |

TABLE 2

Ink formulations used in assessing the organo-titanate-synergist additive.

| Formulation | Nitrocellulose Color Concentrate | Polyethylene Wax Solution | AP Additive 6 | AP Additive 5 | AP Additive 4 | AP Additive 3 | AP Additive 2 | AP Additive 1 |
|---|---|---|---|---|---|---|---|---|
| TPU 1 | 80.0 | 1.0 | | | | | | 1.5 |
| TPU 2 | 80.0 | 1.0 | | | | | | 2.0 |
| TPU 3 | 80.0 | 1.0 | | | | | | 2.5 |
| TPU 4 | 80.0 | 1.0 | | | | | | 2.5 |
| TPU 5 | 80.0 | 1.0 | | | | | 2.5 | |
| TPU 6 | 80.0 | 1.0 | | | | 2.5 | | |
| TPU 7 | 80.0 | 1.0 | | | 2.5 | | | |
| TPU 8 | 80.0 | 1.0 | | 2.5 | | | | |
| TPU 9 | 80.0 | 1.0 | 2.5 | | | | | |
| TPU 10 | 80.0 | 1.0 | | | 2.5 | | | |
| EPU 1 | 75.0 | 1.0 | | | | | | 2.5 |
| EPU 2 | 75.0 | 1.0 | | | | | | 2.5 |
| EPU 3 | 75.0 | 1.0 | | | | | 2.5 | |
| EPU 4 | 75.0 | 1.0 | | | 2.5 | | | |

| Formulation | Ethanol Solvent | Citrate Plasticizer | Neorez U-395 | Arakawa PU-3552 | Surkopak 5323 | Surkopak 5246 |
|---|---|---|---|---|---|---|
| TPU 1 | 6.0 | 1.0 | | | 10.5 | |
| TPU 2 | 5.5 | 1.0 | | | 10.5 | |
| TPU 3 | 5.0 | 1.0 | | | 10.5 | |
| TPU 4 | 4.8 | 1.0 | | | | 10.7 |
| TPU 5 | 5.0 | 1.0 | | | 10.5 | |
| TPU 6 | 5.0 | 1.0 | | | 10.5 | |
| TPU 7 | 5.0 | 1.0 | | | 10.5 | |
| TPU 8 | 5.0 | 1.0 | | | 10.5 | |
| TPU 9 | 5.0 | 1.0 | | | 10.5 | |
| TPU 10 | 5.0 | 1.0 | | | | 10.7 |
| EPU 1 | 3.3 | 1.0 | | 17.2 | | |
| EPU 2 | 3.3 | 1.0 | 16.3 | | | |
| EPU 3 | 4.2 | 1.0 | 16.3 | | | |
| EPU 4 | 4.2 | 1.0 | 16.3 | | | |

TABLE 3

Ink formulations containing prior art adhesion promoters

| Comparative formulation | Nitrocellulose Color Concentrate | Polyethylene Wax Solution | Coatosil 1770 Silane | Zirconium Propionate | Vertec IA10 | Tyzor AA75 | Ethanol Solvent | Citrate Plasticizer | Neorez U-395 | Surkopak 5323 |
|---|---|---|---|---|---|---|---|---|---|---|
| Exp. 1 | 80.0 | 1.0 | | | 2.0 | | 5.5 | 1.0 | | 10.5 |
| Exp. 2 | 80.0 | 1.0 | | 2.0 | | | 5.5 | 1.0 | | 10.5 |

TABLE 3-continued

| Exp. 3 | 80.0 | 1.0 | | 1.0 | | | 6.5 | 1.0 | | 10.5 |
| Exp. 4 | 80.0 | 1.0 | 2.0 | | | | 5.5 | 1.0 | | 10.5 |
| Exp. 5 | 75.0 | 1.0 | | | | 2.0 | 3.8 | 1.0 | 16.3 | |
| Exp. 6 | 75.0 | 1.0 | | | 2.0 | | 3.8 | 1.0 | 16.3 | |
| Exp. 7 | 75.0 | 1.0 | | 1.0 | | | 4.8 | 1.0 | 16.3 | |
| Exp. 8 | 75.0 | 1.0 | 2.0 | | | | 3.8 | 1.0 | 16.3 | |

White Ink Formulae for Discoloration Testing

| Material | White Ink | Exp. 9 | Exp. 10 | Exp. 11 | Exp. 12 |
|---|---|---|---|---|---|
| TiO2 Pigment | 30.0 | 30.0 | 30.0 | 30.0 | 30.0 |
| Nitrocellulose Resin | 11.0 | 11.0 | 11.0 | 11.0 | 11.0 |
| Ethanol Solvent | 30.7 | 30.7 | 30.7 | 30.7 | 30.7 |
| Ethyl Acetate Solvent | 16.3 | 16.8 | 16.8 | 17.8 | 16.8 |
| Citrate Plasticizer | 1.5 | 1.5 | 1.5 | 1.5 | 1.5 |
| Polyethylene Wax Solution | 1.0 | 1.0 | 1.0 | 1.0 | 1.0 |
| Surkopak 5246 | 6.0 | 6.0 | 6.0 | 6.0 | 6.0 |
| AP Additive 1 | 3.5 | | | | |
| Tyzor AA75 | | 3.0 | | | |
| Vertec IA10 | | | 3.0 | | |
| Zirconium Propionate | | | | 2.0 | |
| Coatosil 1770 Silane | | | | | 3.0 |

Note:
The percentages and types of materials used in the Examples in Tables 2 and 3, represent typical ink formulations where the inventive adhesion promoters can be used. An ink formulator with skill in the art would know that the type and percent of materials could be altered for various end-use properties. Examples of other resins that could be substituted or added to the above formulations include vinyl's, urethanes, acrylics, olefins, epoxies, emulsion resins; acrylated resins; or any other film forming material suitable for use in printing inks or coatings.

In a preferred embodiment, the inventive adhesion promoters would be used in printing inks or coatings applied by flexographic or gravure printing processes, but it is understood that the adhesion promoters could also be used in inks or coatings used in other printing or application processes (e.g. litho, inkjet; screen, dip and spray applications; etc.)

Adhesion

To test adhesion, resistance and lamination properties of the printed media, 2% by weight of the novel adhesion promoter compound in Table 1 was used to make the example ink compositions in Table 2. The inks were reduced in viscosity to 18 seconds DIN4 with an alcohol/ester solvent blend Ink draw-downs were produced using a 140 lines per inch flexo hand anilox on the following plastic substrates: corona discharge treated biaxially orientated polypropylene (OPP), chemically treated polyester (chem. PET), aluminum oxide coated polyester (AlOx PET), PVDC coated polyester (PVdC PET), PVDC coated orientated polypropylene (PVdC OPP), Acrylic coated polyester (Acr PET) and oriented polyamide (OPA).

Adhesion of printed liquid inks is measured by each of the three industry standard tests outlined below. Printed proofs are prepared using lab ink proofing equipment as described above, side by side other on the same substrate to ensure identical test conditions. Inks to be compared are always printed alongside each other. Tests are carried out immediately after printing and after a further 24 hours time period where the prints are maintained at room temperature: 25° C.

(1) Tape Adhesion: Industry accepted tape adhesion test was made using 1 inch wide red Scapa tape, ref # 1112 is applied over the printed surface and then peeled rapidly at an angle of 135°. Results are determined by the percentage ink remaining after the removal of the adhesive tape.

(2) Industry accepted scratch resistance test (fingernail scratch test).

(3) Wrinkle resistance in which a print is wrinkled by hand 20 times in order to simulate repeated flexing of the print.

In each case, the printed substrate is then observed for failure of the ink film (i.e. loss of adhesion) and assigned a number from 1 to 5, with 1 representing either very minimal or no loss due to adhesion/scratch/wrinkle failure, and 5 representing complete loss of adhesion/scratch/wrinkle The average score from each of the three tests is provided in table 4 below. Generally speaking, a score of 1 or 2 is preferred, but 3 or 4 may be acceptable for certain end-use applications.

TABLE 4

Adhesion and viscosity test data.

| | Immediate Adhesion | | | | | | 24 hour Adhesion | | | | | |
|---|---|---|---|---|---|---|---|---|---|---|---|---|
| Formulation | OPA | PVdC OPP | PVdC PET | ALOx PET | Chem PET | OPP | OPA | PVdC OPP | PVdC PET | ALOx PET | Chem PET | OPP |
| TPU 3 | 1 | 1 | 1 | 2 | 1 | 1 | 1 | 1 | 1 | 1 | 1 | 1 |
| Exp. 1 | 2 | 3 | 3 | 3 | 1 | 2 | 1 | 2 | 2 | 4 | 1 | 1 |
| Exp. 2 | 2 | 3 | 3 | 3 | 1 | 2 | 1 | 2 | 2 | 4 | 1 | 1 |
| Exp. 3 | 2 | 2 | 2 | 4 | 1 | 2 | 1 | 1 | 1 | 4 | 1 | 2 |
| Exp. 4 | 3 | 3 | 3 | 3 | 2 | 3 | 3 | 2 | 2 | 3 | 2 | 2 |
| EPU 2 | 1 | 1 | 1 | 1 | 1 | 1 | 1 | 1 | 1 | 1 | 1 | 1 |
| Exp. 5 | 2 | 3 | 3 | 3 | 1 | 2 | 1 | 2 | 2 | 4 | 1 | 1 |
| Exp. 6 | 2 | 3 | 3 | 3 | 1 | 2 | 1 | 2 | 2 | 4 | 1 | 1 |
| Exp. 7 | 2 | 2 | 2 | 4 | 1 | 2 | 1 | 1 | 1 | 4 | 1 | 2 |
| Exp. 8 | 3 | 3 | 3 | 3 | 2 | 3 | 3 | 2 | 2 | 3 | 2 | 2 |

Ratings: 1 = No ink removal; 5 = >90% Ink removal

Water/Moisture Barrier Resistance

Water/moisture barrier resistance is measured by placing the printed surface in the SATRA rub resistance tester using a water soaked felt pad under pressure with a 1.76 kg weight for 40 cycles at room temperature.

The printed substrate is then observed for failure of the ink film (i.e. loss of adhesion) and assigned a number from 1 to 5, with 1 representing either very minimal or no adhesion loss, and 5 representing complete loss of adhesion. Generally speaking, a score of 1 or 2 is preferred, but 3 or 4 may be acceptable for certain end-use applications.

Discoloration

As previously disclosed, adhesion promoters currently employed in liquid inks for flexible packaging are known to cause discoloration, often seen as yellowing in white inks. Titanium acetyl acetone (among others) is an example of a class of adhesion promoters associated with yellowing. The adhesion promoters of the present invention exhibit significantly reduced discoloration, in some case eliminating discoloration all together. To test this, yellowing tests were carried out by substituting the comparative adhesion promoters for the inventive adhesion promoter in Example 4 (white ink). The ink is applied using a 140 lines per inch flexo hand anilox. Inventive inks are applied side by side against the comparative inks onto co-extruded biaxially orientated polypropylene, prints are left in an oven at 40° C. for 24 hours, and degree of yellowing is compared visually. Yellowing test results are displayed in Table 5.

A rating of 1 indicates minimal or no yellowing; a rating of 5 indicates severe yellowing. Generally speaking, a score of 1 or 2 is preferred, but 3, 4 or 5 may be acceptable for certain end-use applications.

Odor

The odor of a solvent-based compound is assessed against a known standard. All aspects of test preparation and the forms for recording results have all been based on the British Standard 'methods of test for the assessment of odor from packaging material used for foodstuffs' (reference British Standard 3755:1964 and amended 1971).

The level of odor is assigned a number from 1 to 5, where 1 signifies no discernable odor and 5 signifies significant odor. Generally speaking, a score of 1 or 2 is preferred, but 3, 4 or 5 may be acceptable for certain end-use applications.

TABLE 5

Water/Moisture Barrier, odor and discoloration and stability test data.

| Formulation | Viscosity Stability | Discoloration | Odor | Water Resistance |
|---|---|---|---|---|
| TPU 3 | 1 | 1 | 1 | 1 |
| Exp. 1 | 4 | 5 | 5 | 1 |
| Exp. 2 | 2 | 1 | 1 | 1 |
| Exp. 3 | 2 | 2 | 4 | 2 |
| Exp. 4 | 2 | 1 | 1 | 2 |
| EPU 2 | 1 | 1 | 1 | 1 |
| Exp. 5 | 4 | 5 | 5 | 1 |
| Exp. 6 | 2 | 1 | 1 | 1 |
| Exp. 7 | 2 | 2 | 4 | 2 |
| Exp. 8 | 2 | 1 | 1 | 2 |

Ratings:
Water Resistance: 1 = No ink removal; 5 = >90% ink removal
Odor: 1 = No discernable odor; 5 = Significant odor.
Discoloration: 1 = No discernable change; 5 = Significant discoloration.
Viscosity Stability: 1 = No change; 5 = Significant viscosity increase, i.e. gelation.

Lamination

With the use of the inventive adhesion promoters, due in part to the low level of addition required, no reduction in lamination performance of the resultant inks has been observed, indeed in some cases the lamination performance including after heat-sealing is improved. Also a noticeable change in the 'mode of laminate failure' may occur, specifically, failure is less likely to be caused by ink removal. This particular feature is considered highly desirable by customers.

To test for lamination performance the printed substrate is brought into contact with the secondary substrate to which the adhesive has been applied to achieve a dry film weight of 1.3 to 4.0 gsm (grams per square meter) or as recommended by the adhesive supplier using an adhesive laminator. The laminate sandwich of substrate-ink-adhesive-substrate is left to cure at room temperature for at least 24 hours before testing. The cured laminate is cut into a 15 mm width which can be heat-sealed giving an indication of bond strength in the heat seal area. The laminate is heat sealed at 140° C., at 20 psi (140 kPa) pressure for a 1 second dwell time. The ends of the primary and secondary substrates are fixed to the jaws of the bond strength tester so as to form a T peel and then pulled apart. The force needed to carry out the de-lamination is recorded in Newtons/15 mm units along percentage ink transfer i.e.: 100% ink transfer means ink peeling away from the printed substrate to the secondary substrate; 0% ink transfer means the adhesive remains on either the ink (primary) substrate or the secondary substrate. This is seen to be an advantageous ink property.

TABLE 6

Lamination test data.

| | | OPP | | PET | | PET AlOx | | PVdC PET | | PVdC OPP | | OPA | |
|---|---|---|---|---|---|---|---|---|---|---|---|---|---|
| | Color | Bond | Transfer | Bond | Transfer | Bond | Transfer | Bond | Transfer | Bond | Transfer | Bond | Transfer |
| TPU 1 | Rubine | >2.5 n | 100 | >2.5 n | 100 | <2.0 n | 100 | <2.0 n | 100 | <2.0 n | 100 | <2.0 n | 100 |
| | Cyan | >2.5 n | 100 | >2.0 n | 100 | <2.0 n | 100 | <2.0 n | 100 | <2.0 n | 100 | <2.0 n | 100 |
| TPU 2 | Rubine | >2.5 n | 100 | >2.5 n | 100 | <2.0 n | 100 | <2.0 n | 100 | <2.0 n | 100 | <2.0 n | 100 |
| | Cyan | >2.5 n | 100 | >2.0 n | 100 | <2.0 n | 100 | <2.0 n | 100 | <2.0 n | 100 | <2.0 n | 100 |
| TPU 3 | Rubine | >2.5 n | 100 | >2.5 n | 100 | >2.5 n | 100 | >2.5 n | 100 | >2.5 n | 100 | >2.5 n | 100 |
| | Cyan | >2.5 n | 100 | >2.5 n | 100 | >2.5 n | 100 | >2.5 n | 100 | >2.5 n | 100 | >2.5 n | 100 |
| TPU 4 | Rubine | >2.5 n | 100 | >2.5 n | 100 | <2.0 n | 100 | <2.0 n | 100 | <2.0 n | 100 | <2.0 n | 100 |
| | Cyan | >2.5 n | 100 | >2.5 n | 100 | <2.0 n | 100 | <2.0 n | 100 | <2.0 n | 100 | <2.0 n | 100 |

TABLE 6-continued

Lamination test data.

| | | OPP | | PET | | PET AlOx | | PVdC PET | | PVdC OPP | | OPA | |
|---|---|---|---|---|---|---|---|---|---|---|---|---|---|
| | Color | Bond | Transfer | Bond | Transfer | Bond | Transfer | Bond | Transfer | Bond | Transfer | Bond | Transfer |
| TPU 5 | Rubine | >2.5 n | 100 | >2.5 n | 100 | <2.0 n | 100 | <2.0 n | 100 | <2.0 n | 100 | <2.0 n | 100 |
| | Cyan | >2.5 n | 100 | >2.5 n | 100 | <2.0 n | 100 | <2.0 n | 100 | <2.0 n | 100 | <2.0 n | 100 |
| TPU 6 | Rubine | >2.5 n | 100 | >2.5 n | 100 | <2.0 n | 100 | <2.0 n | 100 | <2.0 n | 100 | <2.0 n | 100 |
| | Cyan | >2.5 n | 100 | >2.5 n | 100 | <2.0 n | 100 | <2.0 n | 100 | <2.0 n | 100 | <2.0 n | 100 |
| TPU 7 | Rubine | >2.5 n | 100 | >2.5 n | 100 | <2.0 n | 100 | <2.0 n | 100 | <2.0 n | 100 | <2.0 n | 100 |
| | Cyan | >2.5 n | 100 | >2.5 n | 100 | <2.0 n | 100 | <2.0 n | 100 | <2.0 n | 100 | <2.0 n | 100 |
| TPU 8 | Rubine | >2.5 n | 100 | >2.5 n | 100 | <2.0 n | 100 | <2.0 n | 100 | <2.0 n | 100 | <2.0 n | 100 |
| | Cyan | >2.5 n | 100 | >2.5 n | 100 | <2.0 n | 100 | <2.0 n | 100 | <2.0 n | 100 | <2.0 n | 100 |
| TPU 9 | Rubine | >2.5 n | 100 | >2.5 n | 100 | <2.0 n | 100 | <2.0 n | 100 | <2.0 n | 100 | <2.0 n | 100 |
| | Cyan | >2.5 n | 100 | >2.5 n | 100 | <2.0 n | 100 | <2.0 n | 100 | <2.0 n | 100 | <2.0 n | 100 |
| TPU 10 | Rubine | >2.5 n | 100 | >2.5 n | 100 | <2.0 n | 100 | <2.0 n | 100 | <2.0 n | 100 | <2.0 n | 100 |
| | Cyan | >2.5 n | 100 | >2.5 n | 100 | <2.0 n | 100 | <2.0 n | 100 | <2.0 n | 100 | <2.0 n | 100 |
| 1 EPU | Rubine | >2.5 n | 0 | >2.5 n | 0 | >2.5 n | 50 | >2.5 n | 0 | >2.5 n | 50 | >2.5 n | 0 |
| | Cyan | >2.5 n | 0 | >2.5 n | 0 | >2.5 n | 0 | >2.5 n | 0 | >2.5 n | 0 | >2.5 n | 0 |
| 2 EPU | Rubine | >2.5 n | 0 | >2.5 n | 0 | >2.5 n | 50 | >2.5 n | 0 | >2.5 n | 50 | >2.5 n | 0 |
| | Cyan | >2.5 n | 0 | >2.5 n | 0 | >2.5 n | 0 | >2.5 n | 0 | >2.5 n | 0 | >2.5 n | 0 |
| 3 EPU | Rubine | >2.5 n | 0 | >2.5 n | 0 | >2.5 n | 0 | >2.5 n | 0 | >2.5 n | 50 | >2.5 n | 0 |
| | Cyan | >2.5 n | 0 | >2.5 n | 0 | >2.5 n | 0 | >2.5 n | 0 | >2.5 n | 50 | >2.5 n | 0 |
| 4 EPU | Rubine | >2.5 n | 0 | >2.5 n | 0 | >2.5 n | 100 | >2.5 n | 0 | >2.5 n | 0 | >2.5 n | 0 |
| | Cyan | >2.5 n | 0 | >2.5 n | 0 | >2.5 n | 0 | >2.5 n | 0 | >2.5 n | 0 | >2.5 n | 0 |
| 1Exp | Rubine | >2.0 n | 100 | >2.0 n | 100 | >1.0 n | 100 | >1.0 n | 100 | >1.0 n | 100 | >1.0 n | 100 |
| | Cyan | >2.0 n | 100 | >2.0 n | 100 | >1.0 n | 100 | >1.0 n | 100 | >1.0 n | 100 | >1.0 n | 100 |
| 2Exp | Rubine | >2.0 n | 100 | >2.0 n | 100 | >1.0 n | 100 | >1.0 n | 100 | >1.0 n | 100 | >1.0 n | 100 |
| | Cyan | >2.0 n | 100 | >2.0 n | 100 | >1.0 n | 100 | >1.0 n | 100 | >1.0 n | 100 | >1.0 n | 100 |
| 3Exp | Rubine | >2.0 n | 100 | >2.0 n | 100 | >1.0 n | 100 | >1.0 n | 100 | >1.0 n | 100 | >1.0 n | 100 |
| | Cyan | >2.0 n | 100 | >2.0 n | 100 | >1.0 n | 100 | >1.0 n | 100 | >1.0 n | 100 | >1.0 n | 100 |
| 4Exp | Rubine | >2.0 n | 100 | >2.0 n | 100 | >1.0 n | 100 | >1.0 n | 100 | >1.0 n | 100 | >1.0 n | 100 |
| | Cyan | >2.0 n | 100 | >2.0 n | 100 | >1.0 n | 100 | >1.0 n | 100 | >1.0 n | 100 | >1.0 n | 100 |
| 5Exp | Rubine | >2.0 n | 100 | >2.0 n | 0 | >2.0 n | 100 | >2.0 n | 100 | >2.0 n | 100 | >2.0 n | 100 |
| | Cyan | >2.0 n | 100 | >2.0 n | 0 | >2.0 n | 100 | >2.0 n | 100 | >2.0 n | 100 | >2.0 n | 100 |
| 6Exp | Rubine | >2.0 n | 100 | >2.0 n | 0 | >2.0 n | 100 | >2.0 n | 100 | >2.0 n | 100 | >2.0 n | 100 |
| | Cyan | >2.0 n | 100 | >2.0 n | 0 | >2.0 n | 100 | >2.0 n | 100 | >2.0 n | 100 | >2.0 n | 100 |
| 7Exp | Rubine | >2.0 n | 100 | >2.0 n | 0 | >2.0 n | 100 | >2.0 n | 100 | >2.0 n | 100 | >2.0 n | 100 |
| | Cyan | >2.0 n | 100 | >2.0 n | 0 | >2.0 n | 100 | >2.0 n | 100 | >2.0 n | 100 | >2.0 n | 100 |
| 8Exp | Rubine | >2.0 n | 100 | >2.0 n | 0 | >2.0 n | 100 | >2.0 n | 100 | >2.0 n | 100 | >2.0 n | 100 |
| | Cyan | >2.0 n | 100 | >2.0 n | 0 | >2.0 n | 100 | >2.0 n | 100 | >2.0 n | 100 | >2.0 n | 100 |

In all cases, inks containing the inventive adhesion promoters exhibited equal or improved lamination performance when compared to inks containing comparative adhesion promoters.

Figure 1:
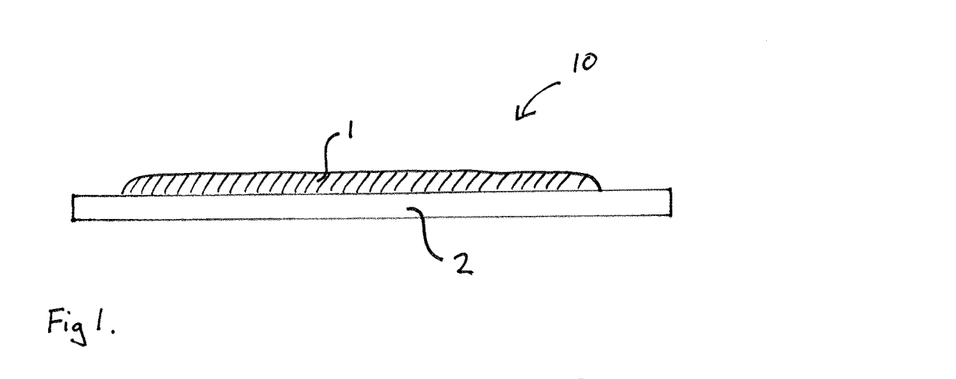
FIG. 1 shows a printed article of the fifth aspect of the invention prepared according to the method of the fourth aspect of the invention including an ink or coating of the second aspect of the invention applied to a substrate.

A first embodiment of a printed article of the fifth aspect of the invention is shown in FIG. 1. The printed article (10) includes a printed image (1) of the cured an ink or coating of the second aspect of the invention superimposed on a substrate (2). The printed article (20) of the first embodiment has been prepared according to the method of the fourth aspect of the invention by applying an ink or coating comprising an adhesion promoter comprising: (a) organotitanate compound; (b) polyamide having an acid and an amine value of from 1 to 25 mg KOH/g to a substrate (2) and curing the ink or coating to provide a printed image (1).

Figure 2:
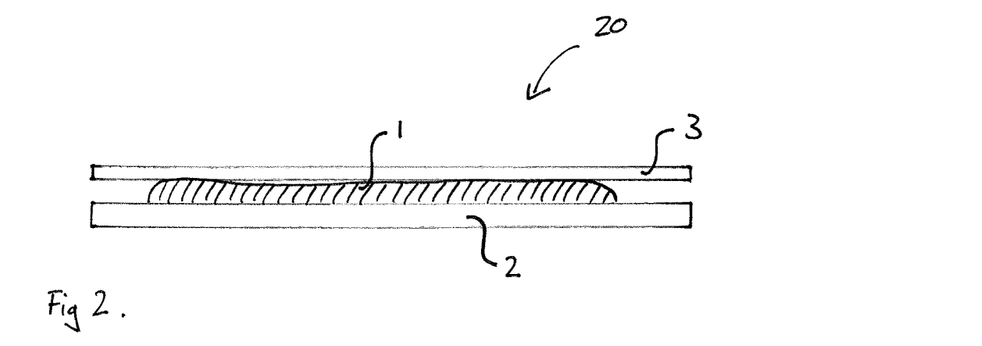
FIG. 2 shows a laminated printed article of the fifth aspect of the invention prepared according to the fourth aspect of the invention in which an ink or coating of the second aspect of the invention is sandwiched between a substrate and an overlay.

A second embodiment of a printed article of the fifth aspect of the invention is shown in FIG. 2. The printed article (20) is a laminated article in which a printed image (1) of the cured ink or coating of the second aspect of the invention is sandwiched between a substrate (2) and an overlay (3). The laminated printed article (20) of the second embodiment has been prepared according to the method of the fourth aspect of the invention by applying an ink or coating comprising an adhesion promoter comprising: (a) organotitanate compound; (b) polyamide having an acid and an amine value of from 1 to 25 mg KOH/g to a substrate (2) and curing the ink or coating to provide a printed image (1), superimposing an overlay (3) on the printed image (1) and applying heat and pressure to form the laminated printed article (20).

The present invention has been described in detail, including the preferred embodiments thereof. However, it will be appreciated that those skilled in the art, upon consideration of the present disclosure, may make modifications and/or improvements on this invention that fall within the scope and spirit of the invention.

We claim:

1. An adhesion promoter in an ink or coating composition, the adhesion promoter comprising:
   (a) 10-60 wt % of an organotitanate compound; and
   (b) 10-60 wt % of a polyamide having an acid and an amine value of from 1 to 25 mg KOH/g;
   wherein the adhesion promoter comprises 0.5-10 wt % of the ink or coating composition;
   and
   wherein the ink or coating can be used as a lamination ink or coating between layers of substrates, without adversely affecting the adhesion between the layers.

2. The adhesion promoter of claim 1, further comprising a volatile organic diluent.

3. The adhesion promoter of claim 2, wherein the volatile organic diluent comprises an alcohol.

4. The adhesion promoter of claim 1 consisting of:
   (a) from about 10 to about 60 wt % of the organotitanate compound;
   (b) from about 10 to about 60% by weight of the polyamide;

(c) additives optionally present at a level up to about 20% by weight; and
(d) a balance of volatile organic diluent.

5. The adhesion promoter of claim 1, wherein the organotitanate compound is an organic titanate selected from a titanium orthoester and a titanium (IV) chelate in which the titanium is chelated to a hydroxyl acid, phosphate, polyol, diketo, hydroxy keto or amino alcohol compound.

6. The adhesion promoter of claim 1, wherein the polyamide is a reaction product of about 1.1 to about 1.0 mole equivalent of dicarboxylic acid with about 1.0 to about 1.1 mole equivalent of diamine.

7. The adhesion promoter of claim 1, wherein the polyamide has an acid value of about 3.5 to about 15 mg KOH/g and/or an amine value of about 3.5 to about 15 mg KOH/g.

8. The adhesion promoter of claim 1, wherein the polyamide is alcohol-soluble.

9. An ink or coating comprising the adhesion promoter of claim 1.

10. The ink or coating of claim 9, further comprising a solvent.

11. A method of producing a printed article comprising applying the ink or coating of claim 9 to a substrate.

12. The method of claim 11, further comprising superimposing an overlay over the ink or coating on the substrate to form a laminated printed article.

13. A printed article comprising the ink or coating of claim 9 on a substrate.

14. The printed article of claim 13, further comprising an overlay, wherein the ink or coating is between the substrate and the overlay.

15. The printed article of claim 13, wherein the overlay is a plastic film.

16. A method of promoting adhesion of an ink or coating to a substrate comprising:
   providing the adhesion promoter of claim 1;
   introducing the adhesion promoter to the ink or coating; and
   applying the ink or coating to a surface of the substrate.

17. The method of claim 16, further comprising superimposing an overlay over the ink or coating.

* * * * *